Nov. 19, 1968  H. THOMA  3,411,608

HYDRAULIC PUMP OR MOTOR

Filed Jan. 27, 1965

INVENTOR
HANS THOMA

Dugger Braddock Johnson & Westman
ATTORNEYS

United States Patent Office 3,411,608
Patented Nov. 19, 1968

3,411,608
HYDRAULIC PUMP OR MOTOR
Hans Thoma, 25 Bellvueweg, Zug, Switzerland
Filed Jan. 27, 1965, Ser. No. 428,418
7 Claims. (Cl. 184—5)

ABSTRACT OF THE DISCLOSURE

An improved axial piston hydraulic pump or motor arrangement of the type in which reciprocating pistons have bearing pads having faces engaging in relative sliding contact with the surface of an inclined swash plate wherein means are provided to maintain an oil film between the relative sliding surfaces which include an unrestricted intercommunicating throughflow passage in the respective pistons and bearing pads and at least one narrow, relatively deep throttling groove of reduced cross-section relative to said throughflow passage in at least one of each of said bearing pad faces and said swash plate surface arranged to be in communication with said throughflow passage at least during a portion of the relative rotation of said pads and swash plate, and in which said passages are free of throttling means. In a particular form the arrangement includes a central recess in each bearing pad surface, communicating with the passage in said pad, an annular oil-distributing groove near the outer periphery of each pad and the throttling groove is of spiral configuration communicating at its inner end with such recess and at its outer end with the annular groove.

---

This invention relates to hydraulic pumps or motors, of the axial piston kind in which pistons in a cylinder block coact with a swash plate or inclined stationary driving plate through bearing pads mounted on the outer ends of the pistons.

In hydraulic pumps or motors of this kind the pistons are reciprocated by rotating either the cylinder block relatively to a stationary inclined driving plate or a swash plate relatively to a stationary cylinder block. In either case the bearing pads are in sliding contact with the opposing surface of the driving plate or swash plate and hereafter they are referred to as sliding pads.

The hydraulic pumps or motors with which this invention is particularly concerned are of the high speed and high pressure axial ram type in which the sliding pads are subjected to a very heavy load which fluctuates rhythmically between a maximum during the delivery stroke and a minimum during the suction stroke, and in which the pads move at high speed relative to the opposing surface of the driving plate or swash plate.

To prevent excessive wear and destruction of the sliding surfaces, it is essential to maintain a film of oil under pressure between the sliding surfaces so as to hold such surfaces out of metallic contact.

With the object of creating the abovementioned oil film between the sliding surfaces it has been proposed to form in the bearing face of each sliding pad one or more straight and radially extending grooves of very small cross-section to act as distributing grooves, and to supply oil under pressure to these grooves from the working cylinders of the machine via passages in the pistons, each passage including a restricted aperture to act as a throttling orifice. A disadvantage of such fixed throttling orifices is that they can become blocked by impurities or fine fibres that are often present in oil.

Accordingly it is an object of the present invention to provide an improved machine of the type referred to, having effective means for maintaining an oil film between the sliding surfaces, and which will be less liable to failure as a result of impurities in the oil.

In its simplest form the invention consists in providing throttling grooves in the opposing faces of the pads may sliding surfaces themselves, such that if any impurities do become lodged in the throttling grooves the relative movement will tend to masticate or eject the impurities.

I have found that if throttling grooves of extended length are used their cross-sectional area may be increased, without destroying their power to throttle the flow of oil and without permitting an excessive flow of pressure oil.

If the throttling grooves are to be cut in the sliding surfaces of the pads it is desirable that each such groove shall be as long as possible to permit its cross section to be as large as possible and for this purpose each throttling groove preferably extends in the form of a spiral over the face of the pad.

To enable straight and shorter throttling grooves to be used having, if desired, a smaller cross section the same can be cut in the bearing face of the inclined plate, as this being ordinarily made of hardened steel will wear very much less quickly than the bronze pads.

By forming the throttling grooves in the inclined plate, throttling grooves in the opposite faces of the pads may be dispensed with but in a preferred form of the invention both the sliding faces of the pads and the sliding face of the inclined plate are formed with throttling grooves.

Normally throttling grooves cut in the sliding surface of the inclined plate will be radial to the plate and on a common pitch circle which enables them during relative motion to bridge a face or land on the bearing surface of each traversing pad which normally isolates an oil distributing groove adjacent to the outer region of said bearing face and an oil receiving recess at the centre of said bearing face.

The radial disposition of the throttling grooves on the face of the inclined plate to a certain extent limits the length of each such groove. This may be avoided, and their length increased by disposing each groove obliquely to the radial.

The desired throttling effect is best obtained with relatively deep but narrow grooves, for example at least 1 mm., without their throttling effect becoming too small.

The throttling grooves in the inclined plate are best formed with a section giving sharp edges so that when co-acting with throttling grooves in the bearing faces of the pads any foreign material including fibres will be ground up small enough not to clog the grooves even if these are of minimum cross section.

In the accompanying drawings are illustrated two examples of the present invention in which.

Figure 1:
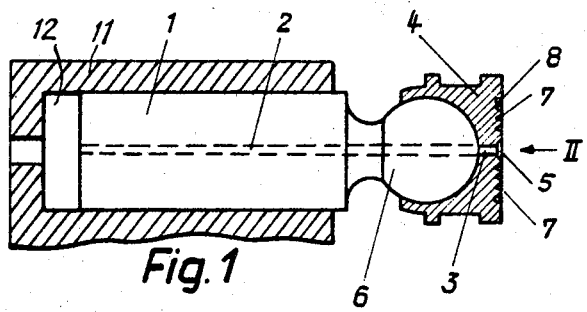
FIGURE 1 is a view partly in elevation and partly in section of the piston of a hydraulic pump or motor fitted at one end with a universally movable sliding pad, the sliding or bearing face of which has cut in it a spiral throttling groove according to the present invention.
Figure 2:
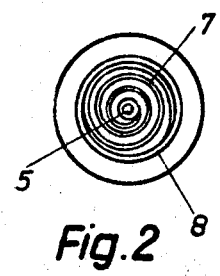
FIGURE 2 is an end view of the sliding pad looking towards the bearing face and illustrating the oil distributing channels which are cut therein.

In the arrangement shown in FIGURES 1 and 2 of the drawings part of a rotary cylinder block is indicated generally at 11. Oil from the space 12 at the inner end of each cylinder containing a piston 1 is forced during each pressure stroke of the piston to flow through a central longitudinal bore or passage 2 in the piston 1 and a further bore or passage 3 in the sliding pad 4 into a small recess 5 in the centre of the bearing face of the pad 4 and in its passage it lubricates a ball and socket joint 6 forming the universal connection between the pad 4 and the piston 1.

From the recess 5 the oil flows through a spiral throttling groove 7 to an annular distributing groove 8 near the outer perimeter of the pad 4.

The throttling groove 7 is narrow in width but relatively deep, for example, not less than 1 mm. and such as to allow the throttled passage of a small amount of oil under pressure, the flow being restricted by friction on account of the length and the narrow width of the spiral groove, which, for preference, is V-shape in cross section. It will be noted that there is relatively little throttling effect on the oil upstream of the throttling groove 7, i.e., in the bores 2 and 3, and in particular there is no upstream throttling orifice smaller than the throttling groove 7.

By means of the throttling effect of the spiral groove 7 and its extended path over the bearing face of the pad 4 a thin body of oil is maintained on the face of the pad 4 as it slides over the opposing face of a stationary inclined plate or a rotating swash plate without being squeezed out by the piston forces.

As will be seen the area of the bearing face of the pad 4 covered by the grooves 7 and 8 is extensive. This feature enables the creation of an oil film which will support the pad 4 by balancing out the piston forces so that its bearing face is held out of metallic contact with the opposing face of the inclined plate.

Figure 3:
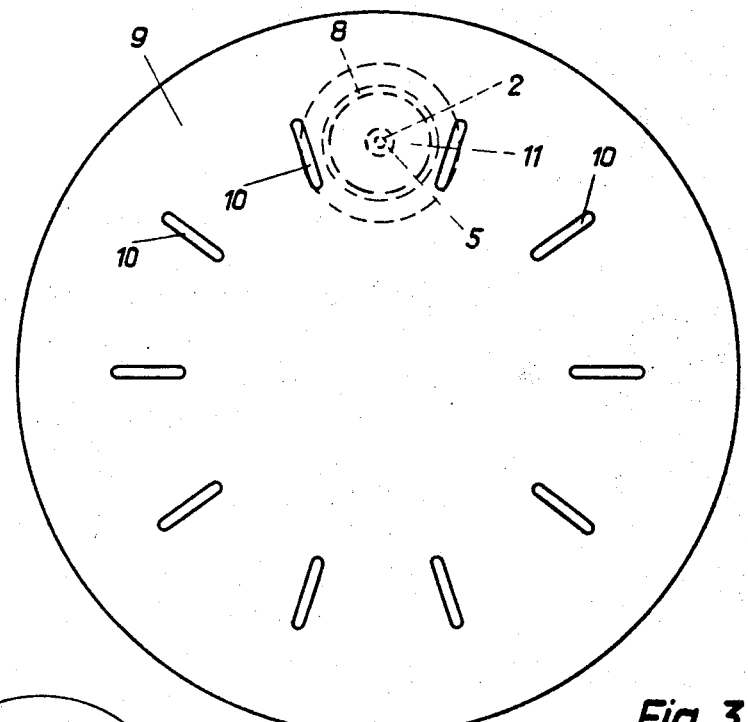
FIGURE 3 is a view in elevation of the bearing face of an inclined plate having cut therein a series of equally spaced radial throttling grooves on a common pitch circle that enables the throttling grooves in the plate to be traversed by the bearing face of each sliding pad in succession as shown in dotted lines in the figure.

In the arrangement shown in FIGURE 3 throttling grooves are cut in the bearing face of the inclined plate which is here indicated by the reference numeral 9. These throttling grooves are represented by a series of straight radial V-section grooves 10 that are equally spaced around a pitch circle which allows each groove 10 in turn to be traversed by a sliding pad, one of which is shown in dotted lines in the figure. This traverse of the face of a pad across each radial groove 10 results in an area 11 normally separating the central recess 5 from the annular oil distributing groove 8 being bridged by a groove 10, thus providing a throttled passage for the flow of oil between the central recess 5 and the distributing groove 8.

The area 11 on the pad face may either be plain so as to isolate the central recess 5 from the distributing groove 8 or such area may be traversed by one or more throttling grooves, but preferably by a spiral throttling groove as in the arrangement shown in FIGURES 1 and 2.

Figure 4:
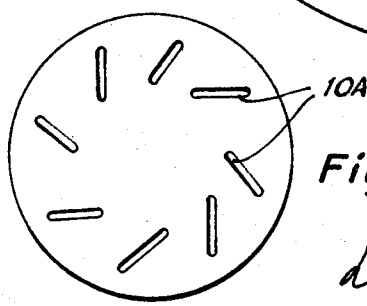
FIGURE 4 is a fragmentary plan view of a plate as shown in FIGURE 3 but on a reduced scale and showing an inclined arrangement of the throttling grooves in the plate.

So as to permit the throttle grooves 10 to be of increased length the same may be disposed obliquely to the radial. Examples of such grooves are shown in FIGURE 4, and are indicated by the reference numeral 10A.

With the throttling groove 10 or 10A arranged at spaced intervals around the face of the plate 9, and in the absence of throttling grooves in the faces of the pads, the oil flow over the face of each pad is interrupted intermittently and at regular intervals. In consequence the relative sliding movement between the pads and the opposing face of the plate 9 must be rapid. It is, however, possible in the arrangement shown in FIG. 3 so to space and dispose the throttling grooves that the rate of interruption of flow is reduced or interruption avoided altogether in which latter case the rate of relative sliding movement above-mentioned may be reduced.

It is, however, an advantage to produce a succession of interruptions in the flow of oil through the throttling grooves as by this means the amount of oil lost through leakage is reduced.

What I claim is:

1. An axial piston hydraulic pump or motor in which pistons in a relatively rotating cylinder block coact with an inclined relatively stationary swash plate through bearing pads mounted on the outer ends of the pistons, said bearing pads being in sliding contact with the surface of the swash plate, oil supply means for delivering oil under full pressure to the face of each said bearing pad, said bearing pads being provided with oil distributing means for maintaining an oil film between the sliding surfaces of the pads and the swash plate comprising a long, narrow, relatively deep groove extending over part of the bearing surface of the pad, said groove being of spiral configuration and of small section so as to throttle the flow of oil lengthwise therethrough to produce a fall in the pressure of the oil in the direction of its flow, said oil supply means being free of any throttling orifice, said bearing pad having a central recess in its bearing face in communication with said oil supply means and said spiral throttling groove being open at its inner end to said central recess to receive oil under full pressure from the supply means, and said bearing pad also having a distributing groove adjacent to the outer circumferential surface of the bearing face of the pad.

2. An axial piston hydraulic pump or motor in which pistons in a relatively rotating cylinder block coact with an inclined swash plate through bearing pads mounted on the outer ends of the pistons, said bearing pads being in sliding contact with the surface of the plate, and including oil distributing means for maintaining an oil film between the sliding surfaces, said oil distributing means including at least one groove of small cross-sectional area in the bearing face of the inclined swash plate, and wherein each bearing pad has an oil distributing groove adjacent to the outer region of the bearing face and an oil-receiving recess at the center of said bearing face, each pad having an annular land which lies between and normally isolates said oil distributing groove and recess, and the groove on the plate having such length as to bridge said annular land, as the pad rotates relative thereto, to provide a throttled flow of oil from said central oil-receiving recess to said outer oil distributing groove.

3. An axial piston hydraulic pump or motor in which pistons in a cylinder block coact with an inclined swash plate through bearing pads mounted on the outer ends of the pistons, said bearing pads each having a central oil-receiving recess and an oil distributing groove spaced from said recess, each pad being in sliding contact with the facing surface of the swash plate, said pistons and pads having respective communicating passages therein to supply oil to said central recess, oil distributing means for maintaining an oil film between the sliding surfaces of the pads and swash plates, said oil distributing means comprising at least one elongated throttling groove of small section in the bearing face of each pad to throttle the flow of oil therealong, and the bearing face of the inclined swash plate having throttling grooves therein arranged in the pitch circle covered by said bearing pads, and wherein said throttling grooves in the swash plate are spaced angularly from each other so as to provide intermittent communication between the oil distributing groove of each pad and the oil-receiving recess at the center of each pad, and the throttling groove in each pad providing a continuously open throttled connection between said central oil receiving recess of the pad, and said oil distributing groove spaced therefrom.

4. In an axial piston hydraulic pump or motor of the type including a cylinder block means having piston accommodating cylinders therein, pistons reciprocably disposed in the cylinders, and having outer ends, bearing pads mounted on said outer ends and having outer faces, each piston and its associated bearing pad having an oil supply passage therethrough, said passages being in respective communication, and an inclined swash plate having a surface in facing relation to said bearing pad faces, said cylinder block and swash plate being relatively rotatable whereby the faces of the bearing pads are in sliding contact with the surface of the swash plate, the improvement comprising means for maintaining an oil film between the relatively sliding surfaces of said pads and swash plate in which at least one of each of said bearing pad faces and said swash plate surface has at least one long in relation to the transverse dimension of a bearing pad face, narrow, relatively deep throttling groove therein of reduced cross section so as to throttle the flow of oil lengthwise therethrough to effect a reduction in the pressure of the oil in its direction of flow, said groove being in communication with the passages in said bearing pads at least during a portion of the relative rotation of said pads and swash plate and said passages being free of any throttling means.

5. In an axial piston hydraulic pump or motor as claimed in claim 4 and in which the surface of said swash plate has a plurality of throttling grooves therein arranged in angularly spaced relation and disposed to be in the pitch circle covered by said pads during relative rotation.

6. In an axial piston hydraulic pump or motor as claimed in claim 4 and in which the face of each pad has a central oil-receiving recess therein in communication with the passage in such pad and a groove of spiral configuration therein, said groove having an inner end communicating with said recess and constituting said throttling groove.

7. In an axial piston hydraulic pump or motor as claimed in claim 6 and the face of each pad also having an oil distributing groove therein spaced outwardly from said oil-receiving recess and said spiral throttling groove having an outer end communicating with said oil distributing groove.

References Cited

UNITED STATES PATENTS

| | | | |
|---|---|---|---|
| 1,964,300 | 6/1934 | Perry et al. | 138—42 X |
| 3,120,816 | 2/1964 | Firth et al. | 103—162 |
| 2,250,512 | 7/1941 | Vickers | 184—6 |
| 2,858,771 | 11/1958 | Cornelius | 184—6 |

FOREIGN PATENTS 1,260,039  3/1961  France.

HOUSTON S. BELL, JR., *Primary Examiner.*